United States Patent [19]

Ernst

[11] Patent Number: 5,340,052
[45] Date of Patent: Aug. 23, 1994

[54] SELF-SENSING CLAMPING DEVICE FOR A SAFETYBELT SYSTEM

[75] Inventor: Hans-Hellmut Ernst, Ahrensburg, Fed. Rep. of Germany

[73] Assignee: Autoliv Development AB, Vargarda

[21] Appl. No.: 811,527

[22] Filed: Dec. 20, 1985

[30] Foreign Application Priority Data

Dec. 21, 1984 [DE] Fed. Rep. of Germany ....... 3446981

[51] Int. Cl.$^5$ ............................................. B60R 22/42
[52] U.S. Cl. ................................ 242/381.1; 242/381.4
[58] Field of Search ................ 242/107.2; 24/132 WL, 24/134 L, 136 K, 170, 171; 188/65.1; 280/806, 807, 808; 297/478, 480

[56] References Cited

U.S. PATENT DOCUMENTS

| 2,071,903 | 1/1937 | Shively | 242/107.2 X |
| 3,205,004 | 9/1965 | Spouge | 242/107.2 X |
| 3,504,867 | 4/1970 | Stevenson | 242/107.2 |
| 3,847,434 | 11/1974 | Weman | 242/107.2 X |
| 3,871,599 | 3/1975 | Takada | 242/107.2 |
| 4,211,377 | 7/1980 | Yasumatsu | 242/107.2 |
| 4,243,185 | 1/1981 | Motonami | 242/107.4 A X |
| 4,360,171 | 11/1982 | Reid et al. | 242/107.2 |
| 4,422,593 | 12/1983 | Takada | 188/65.1 X |
| 4,437,623 | 3/1984 | Wyder | 242/107.4 A X |
| 4,438,551 | 3/1984 | Imai | 242/107.4 A X |
| 4,480,804 | 11/1984 | Ando | 242/107.2 |
| 4,482,103 | 11/1984 | Sano et al. | 188/65.1 X |
| 4,544,112 | 10/1985 | Ziv | 242/107.4 A X |
| 4,570,975 | 2/1986 | Kawaguchi | 242/107.2 |

FOREIGN PATENT DOCUMENTS 0056894 4/1982 European Pat. Off. .
0087499 7/1983 European Pat. Off. .

Primary Examiner—John M. Jillions
Attorney, Agent, or Firm—Dilworth & Barrese

[57] ABSTRACT

A self-sensing belt clamping device (10), for a safetybelt system is characterized especially by the fact that a car-sensitive locking body (48) and a belt-sensitive inertial system (90) are associated via a precontrol lever (44) directly with a rocking lever (38) and clamping member (26) and therefore can take effect without any substantial delay on the desired clamping of the belt, without having to apply a large initiating force by means of the sensor. Such a clamping device according to the invention can be independently arranged at any desired point between the door threshold and the deflector fitting in the B column. It can therefore be combined advantageously with a winder to form a winding clamp or with a deflector to form a deflection clamp.

28 Claims, 8 Drawing Sheets

SELF-SENSING CLAMPING DEVICE FOR A SAFETYBELT SYSTEM

The invention concerns a self-sensing clamping device for a safetybelt system comprising a clamping member which clamps the belt upon the occurrence of predetermined acceleration forces, with which member is associated a response sensor which is directly driven by the said accelerations.

Such a self-sensing and independent clamping device (EP-PS 0087 499, EP-PS 0056 894 and U.S. Pat. No. 4,360,171) can be associated with a roller or another device for the storage of a supply of belt. The decisive factor as against a normal roller which is not coupled with a clamping device is a clearly shorter extraction of the total belt when it is blocked under load (accident). This is mainly due to the fact that the so-called film reel effect cannot take place.

The self-sensing clamping device in accordance with EP-PS 0087 499 comprises a CS (car-senstive) sensor which responds depending on the accelerations and decelerations of the vehicle, but-directly actuates the body of the clamping member. Such a reaction is moreover only possible in the longitudinal direction of the vehicle, i. e. in the case of frontal and rear collisons. A WS (web-sensitive) sensor is not provided.

EP-PS 0056 894 concerns a self-sensing clamping device which is arranged above a conventional self-locking roller.

There the sensor actuates a lever rod which is tensioned shortly before top dead centre. Thus this concerns a sensor which only responds in the case of major decelerations (in an accident). Here too the total energy for the activation of the clamping member originates from the sensor mechanism. In addition a special lever is necessary for unlocking in the initial position.

Another self-sensing clamping device, such as is known from U.S. Pat. No. 4,360,171, comprises a car-sensitive sensor which also directly actuates the material of the clamping parts so that a relatively great actuating force has to be exerted by said sensor. This clamping device also does not contain a web-sensitive sensor. Thus it is sensitive in only one mode.

Therefore it is the object of the invention to create a self-sensing clamping device of the type named above in which not only does the clamping effect operate as quickly as possible in order to minimalize as far as possible the extraction of the belt, but also in order that only a relatively small force proceeding from the sensor is adequate to cause the clamping effect.

This object is achieved according to the invention in that the response sensor is a sensor which is responsive in every direction, by means of which a precontrol element which comes into contact with the belt is in operative connection with said clamping member so that this precontrol element, owing to the motion caused by the belt, brings the clamping member into engagement with the belt in the event that it is actuated.

The provision of a precontrol element, which can be very light and very small in dimensions,requires from the sensor only a minor actuating force so that the sensor itself can be substantially adapted to the demands placed on it and can be dimensioned so that an optimal response is guaranteed in the case of the desired decelerations and accelerations. This system not only responds in every direction, but also in the inverted position. The sensor control elements can be made both small and light so that secure clamping blocking is guaranteed at every deceleration of more than 0.45 g (car-sensitive) or of 1.5 g (web-sensitive).

For the main blocking (the blocking- of the belt), clamping etc., load-absorbing parts (locking members) are displaced from an idle position to a locking position. The force for this process is derived from the extending belt, which transfers by means of coupling members (the sensor mechanism) the locking member or the locking members into the blocked position.

The response sensor can be a vehicle-sensitive or a belt-sensitive response sensor. But there is also the possibility of designing the response sensor to be a combination which is belt-sensitive and also vehicle-sensitive and thus of constructing the self-sensing clamping device to be doubly sensitive, in order to make possible the clamp blocking both by means of web-sensitive activation (WS) as well as by means of car-sensitive activation (CS), which provides the readiness for clamp-blocking at all accelerations of more than 0.45 g (CS) and 1.5 g (WS).

The car-sensitive response sensor body is preferably a ball which takes effect indirectly when it is moved out of the normal idle position and takes effect via the precontrol element on the clamping member.

The web-sensitive system is an acceleration-dependent inertial system, which also takes effect indirectly by means of an actuating lever on the same precontrol element on the rocking lever and clamping member or in an alternative embodiment takes effect by means of a spring-biased deflection on the clamping member.

For a clamping effect which takes effect substantially over the entire area between the clamping surface of the clamping member and the belt or a counter-pressure surface, the clamping member can be connected in hinged manner with a rocking lever and can engage with this planar-surface clamping area with at least one stop spaced from the belt. An actuating member is rotatably mounted on the clamping member, and said actuating member is operatively connected with the car-sensitive response sensor so that the latter presses the actuating member to engage with the belt and thereby effects a pivotal motion of said rocking lever, owing to which the clamping surface comes to engage with the belt.

Preferably the precontrol element is designed as a precontrol lever rotatably mounted on the clamping member, in which said precontrolled lever when supported on the belt transfers a supporting moment to the clamping portion and thus to the rocking lever.

But the precontrol element can also be designed as a precontrol lever which is mounted to be self-rotatable, preferably on the rotational axis of said rocking lever. This precontrol lever is expediently arranged so as to be movable in a groove of said rocking lever, in order to provide a compact total design. On the side of the rocking lever facing away from the groove a cam which permits a certain movement of the precontrol lever is arranged on the rocking lever so that the precontrol lever carries with it the rocking lever and thus the clamping part and presses against the safety-belt when the belt,after making contact with the precontrol lever,- moves the latter corresponding to a pivotal motion. Once the clamping portion has made contact with the belt, a self-reinforcing effect sets in and the task of the precontrol lever is thus performed.

The precontrol lever is preferably provided with two attachments, of which one is inoperative connection with a car-sensitive sensor and the other is operatively connected with the web-sensitive sensor, while both sensors take effect independently of each other on the precontrol lever. Hence one of the attachments can project through the rocking lever, because expediently the car-sensitive sensor is arranged on the safety-belt storage side and the web-sensitive sensor is arranged on the opposite side of said sensor on the same side as the belt, wherein the attachment which is associated with the car-sensitive sensor can be designed as a plunger (which is pushed) and the attachment which is associated with the web-sensitive sensor can be designed as a tension element (it is tightened).

So that for example the web-sensitive sensor does not impede actuation by the car-sensitive sensor, in the named tension element a longitudinal slit is formed in which an actuating pin of the web-sensitive sensor operates as a carrier.

On the end of the precontrol lever facing the belt there is preferably a gripper element which is rotatable within limits.

Preferably this gripper element can consist of a gripping surface and a part circular-cylindrical bearing element arranged thereon which part circular-cylindrical bearing element engages in a corresponding recess of said precontrolled lever.

The gripper element and/or the clamping member can be rotatable as rotatable parts under the influence of frictional resistance so that these parts, after their first engagement on the belt and subsequent detachment therefrom adopt a relative angular position to the rocking lever or to the precontrol lever such that on the pivoting back of the gripping or clamping surface, the latter comes into total-area contact with the belt.

One advantageous embodiment is designed so that the belt-sensitive response sensor can be actuated on the basis of a belt deflection by means of the stretching of the belt wherein the force components in the belt initiate the activation of the clamp as from a certain belt force, which results from the acceleration of belt extraction and the inertial resistance.

In the case of the combination of the clamping device with a belt winder storage, the belt-sensitive response sensor can expediently be designed as a deflection member for the belt, in which this deflection member is located between the belt storage and the clamping member. This deflection member normally holds the belt at a small distance from the clamping surface of the clamping member. At a predefined belt acceleration, the deflection member is moved so that the clamping surface of the clamping member can be brought to engage with the belt, where upon the latter is carried with it and thus clamping takes effect.

The belt deflection can be resiliently pre-biased as a web-sensitive response sensor in the direction of the belt and can be movable away from it.

In another embodiment the clamping surface of the clamping member can be designed directly adjacent to the web-sensitive response sensor as an elastic insert with a high frictional coefficient.

The deflection member can also be designed as a leg of a rotatable angle lever, whose other leg is operatively connected with the rocking lever.

In an embodiment which responds with particular precision, the web-sensitive sensor comprises advantageously a pivotably mounted actuating lever, with which a rotary part constantly moving with the belt is associated. An inertial mechanism integrated therein which is known per se can be used to couple the rotary part with said actuating lever so that the precontrol lever is activated web-sensitively.

An expedient embodiment results when the self-sensitive clamping device can be combined with a winder to form a winding clamp and with a deflector to form a deflection clamp, and in that the deflector is formed from the housing of the clamping device.

Further details, features and advantages of the invention result from the following description of the embodiments which are shown purely schematically in the drawings, in which.

Figure 1:
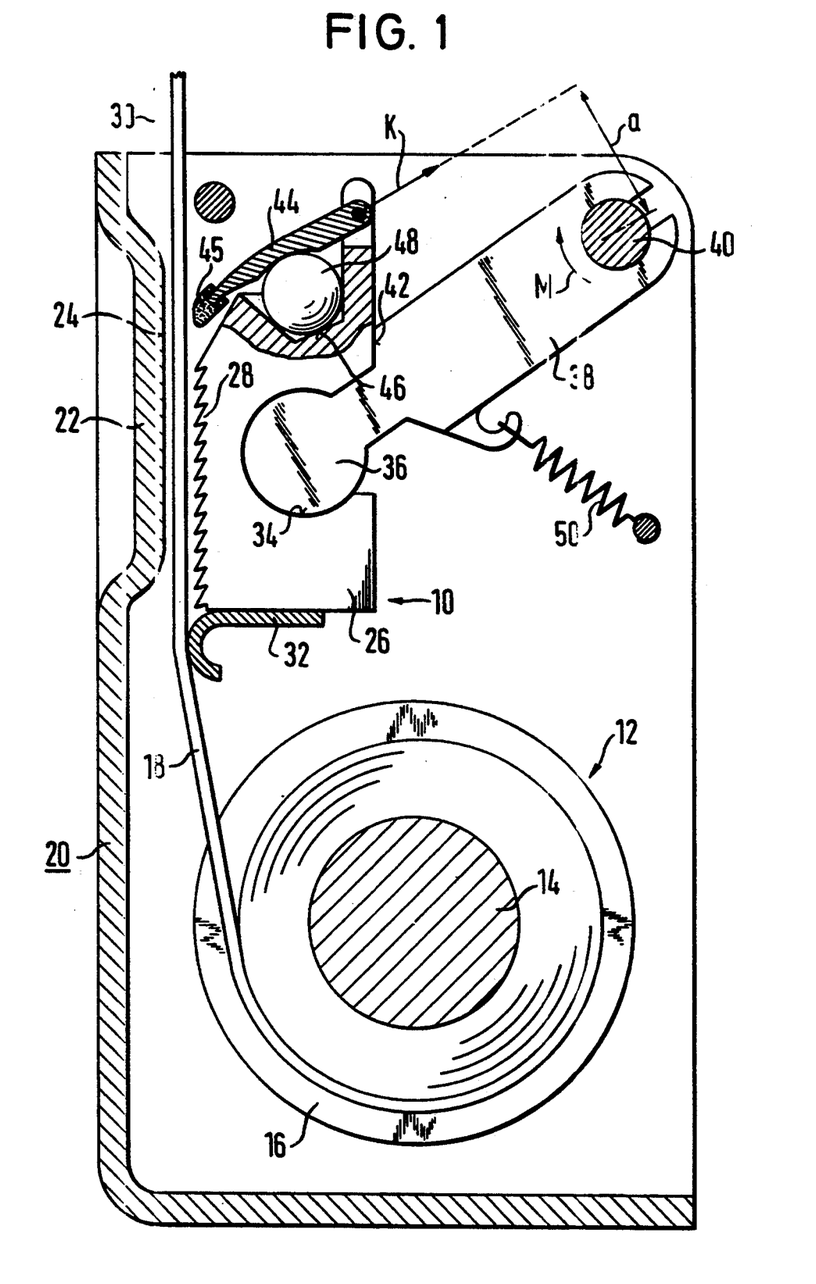
FIG. 1—shows a schematic sectional view through a belt clamping device in connection with a winder as belt storage, FIG. 2—shows a partial sectional view of the embodiment according to FIG. 1 but with a web-sensitive response sensor, FIG. 3—shows a detail with respect to the clamping surface of the clamping member, FIG. 4—shows a schematic sectional view through an embodiment of the web-sensitive activation modified as compared with FIG. 2, FIG. 5—shows a schematic view of an embodiment modified as compared with FIG. 1 of a clamping-device as a self-sensing and independent clamping unit, FIG. 6—shows an exploded illustration of a part of the rocking lever, FIG. 7—shows a schematic side view of web-sensitive sensor with a partial illustration of the precontrolled lever, FIG. 8—shows an example of a self-sensing and independently-functioning clamping device, and FIG. 9—shows a sectional view of a B-column having a deflection clamp as a combination of self-sensing clamping device and deflector.

FIG. 1 shows schematically the actual self-sensing device 10 as a special case in connection with a storage winder 12. This storage winder consists of a winding reel having a reel core 14 and reel flanges 16. On said reel core 14 the belt 18 of a safety-belt system is wound. However another device can be provided for the storage of a supply of belt which holds the belt tightly at a certain force.

The self-sensing clamping device 10 and the winder 12 can be accomodated in a common housing 20, wherein in the area of the clamping device a reinforcing seam 22 is formed with a counter pressure surface 24. Opposite said counter pressure surface 24 there is a clamping member 26 which is provided with a preferably toothed planar clamping surface 28. Between the counter pressure surface 24 and the clamping surface 28 the belt 18 extends and is drawn off in the direction of the arrow 30 from the winder 12. Between the clamping member 26 and the winder 12, there is a guidance member 32 which on the one hand forms a stop for the clamping member 26 in its starting position and on the other hand holds the clamping member 26 at a small distance from the belt 18.

Clamping member 26 is connected via a preferably part circular-cylindrical recess 34, which is open on one side, to a part circular-cylindrical rotary pin 36 of a rocking lever 38, which rocking lever 38 is pivotable in a pivotal axis 40 and forms on its upper side a stop 42 for said clamping member 26.

At the top end of the clamping member 26 a precontrol lever 44 is rotatably mounted, which is opposite a depression 46 in the clamping member 26. In this depression there is a ban 48 on which the sensor pawl 44 rests. The precontrol lever has a gripper point 45 which can be designed as a rubber point or as a small toothed surface. On the bottom side of the rocking lever 38 a tension spring 50 engages, which can return the rocking lever 38, after the end of the clamping process, to its initial position. In order that this can be achieved with maximal certainty, the counter pressure surface 24 has a relatively low frictional coefficient.

The function of the device according to FIG. 1 will be described below. When the vehicle, in which the device illustrated is mounted, experiences a certain deceleration or acceleration (exceeding 0.45 g) the ball 48 is moved and thereby brings the point 45 of the precontrol lever immediately and without any delay into engagement with the belt 18. When with a certain deceleration the passenger in the vehicle moves forwards and thus the belt is drawn from the winder 12, the belt 18 exerts a force directly on the precontrolled lever 44 which has approximately the direction of the arrow K in FIG. 1. Since the clamping member 26 engages on the stop 42 of the rocking lever 38, this force with the lever arm takes effect with respect to a torque M around the pivotal axis 40, with the result that the clamping member 26 comes to engage said belt with the lower edge of its clamping surface 28 and then the clamping member 26 is detached from the stop 42 to that the total clamping surface 28 engages the belt and thus takes effect over its whole surface due to the extraction of the belt.

When the belt extraction stops, the spring 50 returns the entire clamping system to its original position.

Here it is of particular importance that clamp blocking takes place at any excess acceleration (0.45 g for car-sensitivity, and 1.5 g for web-sensitivity). Only in this way can the shortest possible extraction of the belt under load be attained.

Figure 2:
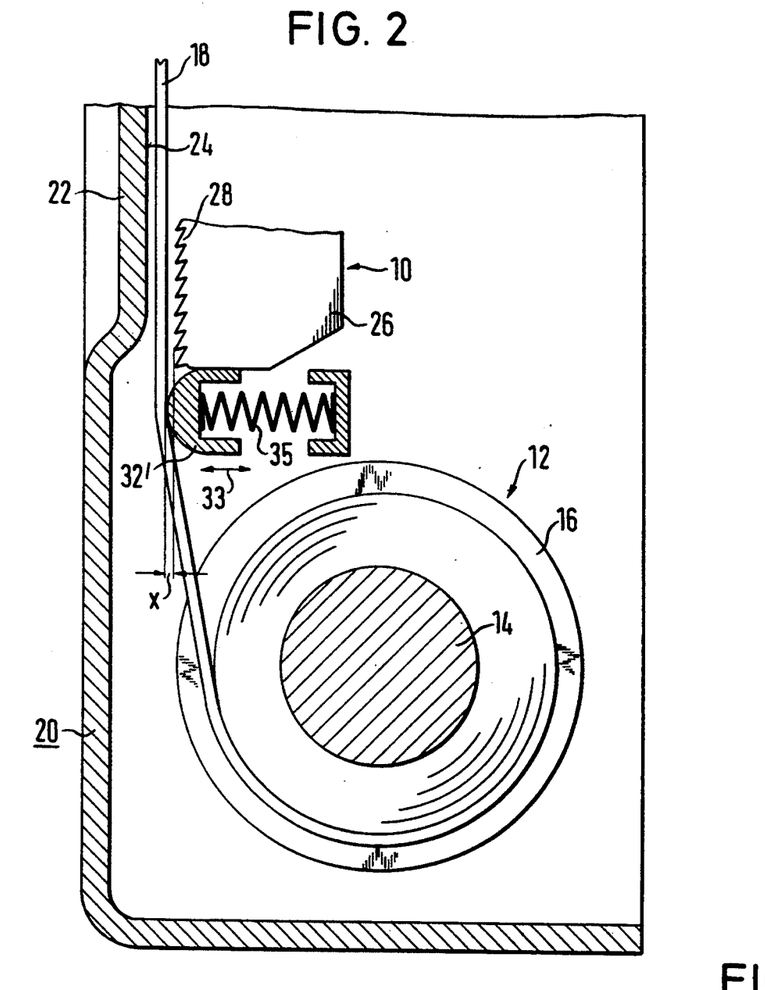

FIG. 2 shows a system which is comparable with FIG. 1, using the guidance member 32', as a belt-sensitive response sensor which can be used either by itself or in combination with the car-sensitive response sensor which is shown in FIG. 1. This guidance member 32' thus performs a triple function, namely the function of forming a stop for the clamping member 26, a deflection or guidance function for the belt 18 and a function as a belt-sensitive response sensor.

The guidance member 32' is arranged to be movable backwards and forwards corresponding to the double arrow 33 in FIG. 2, and against the compression spring 35. This spring 35 is designed so that the guidance member 321 keeps the belt 18 at a small spacing x to the clamping surface 28.

This belt-sensitive response sensor functions so that with a belt extraction acceleration of from 1 to 1.5 g the spring 35 is compressed so that the belt comes into inhibiting contact with the clamping surface 28 of the clamping member 26. This has the result that the clamping jaw is carried along by the belt and thus the desired clamping effect operates directly and without delay.

Figure 3:
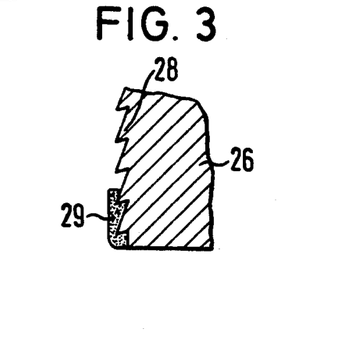

FIG. 3 shows a special design of the clamping surface 28 of the clamping member 26. In the lower area of the clamping surface 28, i. e. directly adjacent to the guidance member 32' there is a rubber insert 29, which effects the first engagement between the belt and clamping member when at the named acceleration of belt extraction the guidance member 32' moves to the right in FIG. 2 (car-senstive+web-sensitive).

Figure 4:
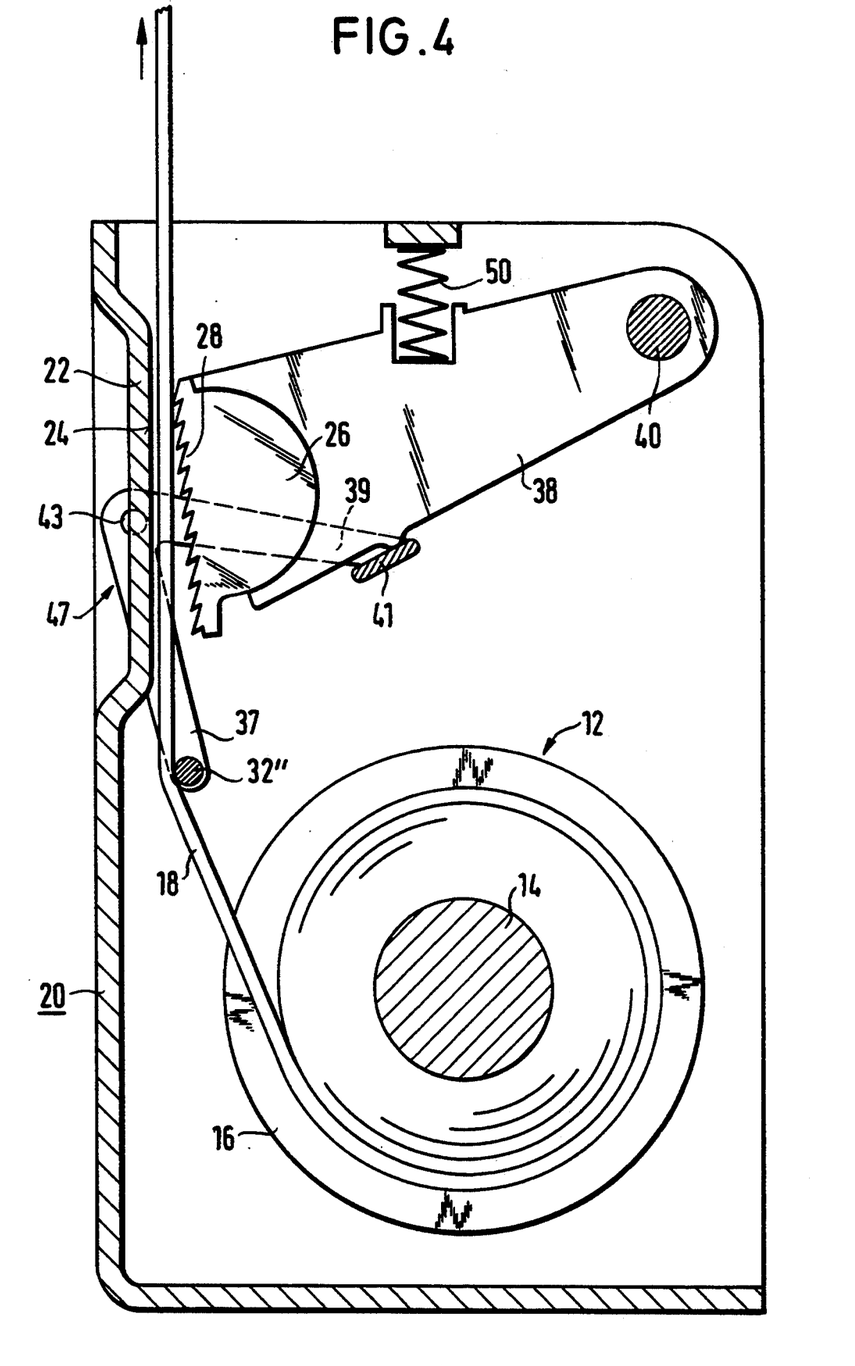

In the embodiment which is shown in FIG. 4 of a belt-sensitive motion of the clamping member 26 together with the rocking lever 38, the actual deflection 32" takes place at the end of a rocking lever 37 of an angle lever 47 which is rotatably mounted at 43. On the other leg 39 there is a carrier plate 41.

Especially when the belt 18 is unwound from the reel 12 and a certain extraction acceleration of the belt takes place, the belt presses the deflection member 32" to the right in the drawing so that the angle lever 47 completes a rotation anticlockwise. The carrier 41 takes the rocking lever 38 with it and brings the clamping surface 28 of the clamping member 26 into contact with the belt 18, whereby the sensory initiation of the clamp blocking is concluded.

Figure 5:
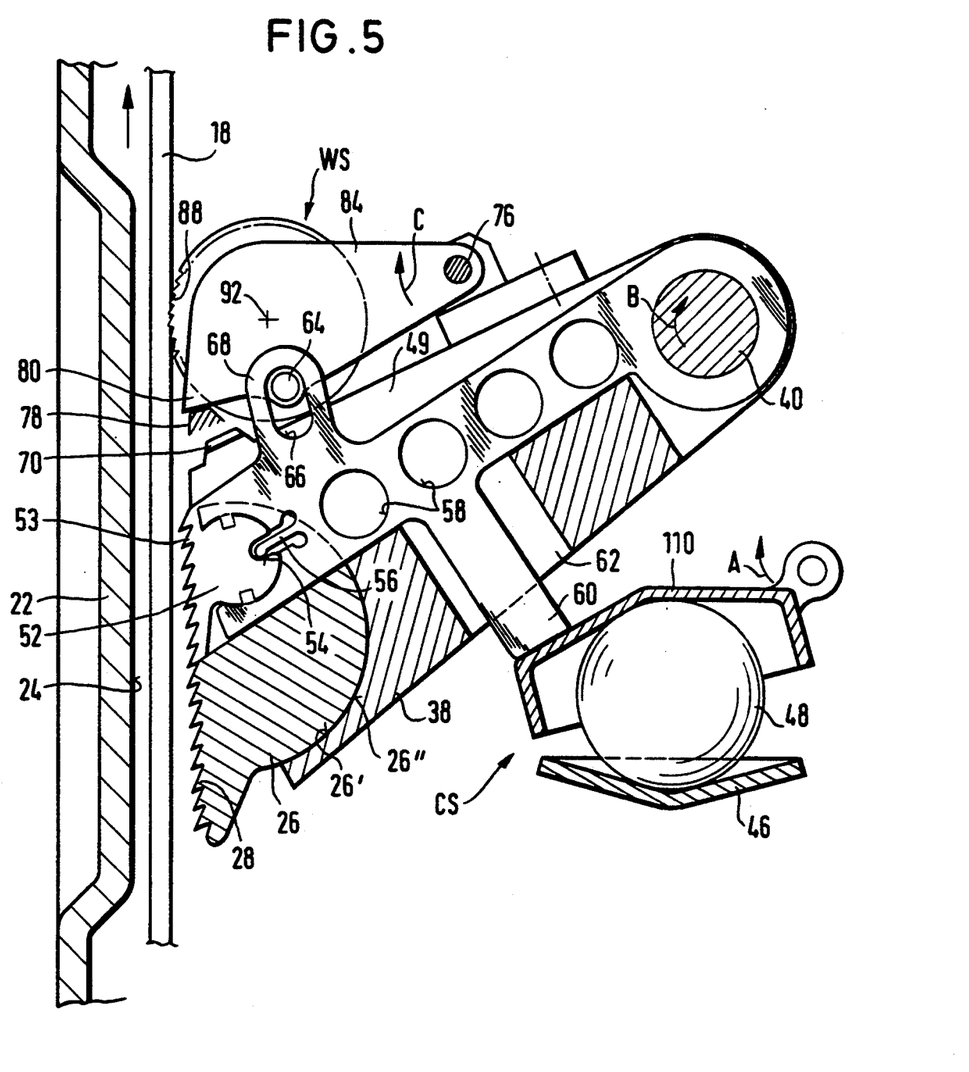

To the extent that the embodiment according to FIG. 5 is identical with that in FIG. 1, the same reference numerals are used, although these parts are sightly differently constructed. In the rocking lever 38 there is an open groove 49 which is more clearly seen from FIG. 6 and which opens outwards, as well as a slot 49' which aligns with it in the clamping member 26. Corresponding to the illustration in FIG. 5, on the pivot axle 40 of the rocking lever 38 the known precontrol lever is shown. Since the groove 49 is open upwards, this precontrol lever 44 is certainly substantially embedded in the rocking lever 38, but it is pivotable in this groove around the pivot axle 40. On the end opposite to the pivot axle 40 this precontrol lever has a gripper element 52 which is located similarly in this precontrol lever and functions like the clamping member 26 in the rocking lever 38. Preferably this gripper element 52, which has a toothed gripping surface 53, is latched into a recess of the precontrol lever so that gripper element 52 is certainly rotatable around an axis perpendicular to the plane of the drawing, but however is not movable in the direction of this axis. The last named impediment to movement can be designed in various ways so that the smallest possible width of the precontrol lever is possible in this axial direction. For example the precontrol lever can be provided for this purpose in the direction of the interior of the named recess with a projection which engages in a corresponding radial recess of the bearing portion of said gripper element. The gripper element 52 can be located with its preferably part circular-cylindrical bearing portion in the recess with friction so that the gripper element 52 remains in the desired position. This makes it possible to design the angular position of the gripper element and its gripping surface 53 so that the gripper element, when it engages with its gripping surface 53 on the belt, is aligned in this position in relation to the precontrol lever 44 and then when it is moved away from the belt, remains in this position, so that on every subsequent approach movement to the belt, the gripping surface at once engages with the whole of its surface on the belt. The same can be effected in connection with the clamping member 26.

If it is desired always to keep the gripper element 52 in a certain position, it can be provided in accordance with the drawing in FIG. 5 with one side facing away from the gripping surface 53 which has a slit-type recess 54, in which an elastically deformable tongue 56 of the precontrol lever engages when the gripper element 52 is latched into the recess located at the end of the precontrol lever 44.

The gripper element 52 projects through the slit-type recess 49' of the clamping member 26 and thus, with a compact design, can be simply made to engage with the belt.

The precontrol lever has bores 58 to lighten it and reduce its weight.

Below the rocking lever 38 there is the car-sensitive sensor CS with the ball cup 46, the ball 48 and the sensor pawl 44' which is actuated directly by the ball. This sensor pawl 44' takes effect on a plunger 60 on the lower end of the precontrol lever 44 which projects through a passage way 62 of the rocking lever 38. On the opposite side of rocking lever 38 there is a belt-sensitive sensor WS which is shown in more detail in FIG. 7. This belt-sensitive sensor projects with a pin 64 into the longitudinal slit 66 of a traction element 68 of the precontrol lever 44.

The gripping surface 53 of gripper element 52 has preferably two adjacent rows of fine teeth, which are swept back against the withdrawal direction of the belt 18 in order to effect a more efficient grasping of the belt.

Figure 6:
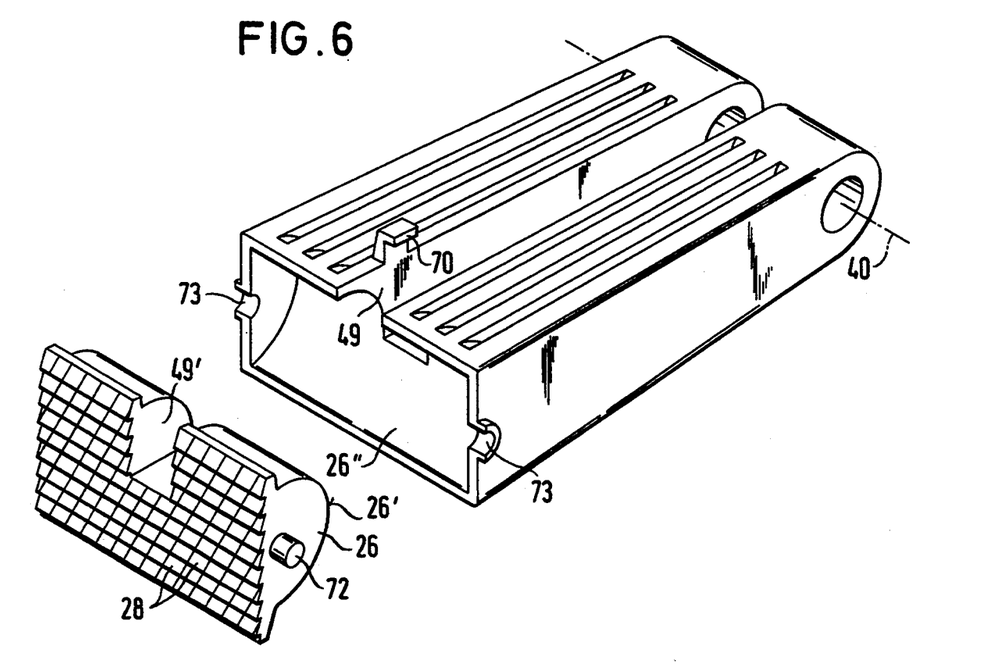

As can be seen from FIG. 6, rocking lever 38 has, outside the groove 49, carrier 70 on which the top of the precontrol lever 44 engages in the event of an activation stroke. As can be seen from FIG. 6 the clamping element 26 rests not only with its part circular-cylindrical bearing portion 26' in the corresponding depression 26" of the rocking lever 38. In addition the clamping portion 26 has on its front face bearing pins 72 which rest in the bearing cups 73 of the rocking lever 38 so that there the load acceptance takes place during car-sensitive, belt-sensitive and duration tests. The load acceptance, after deformation of the two bearing pins as from about 1 kN, takes place in depression 26".

Figure 7:
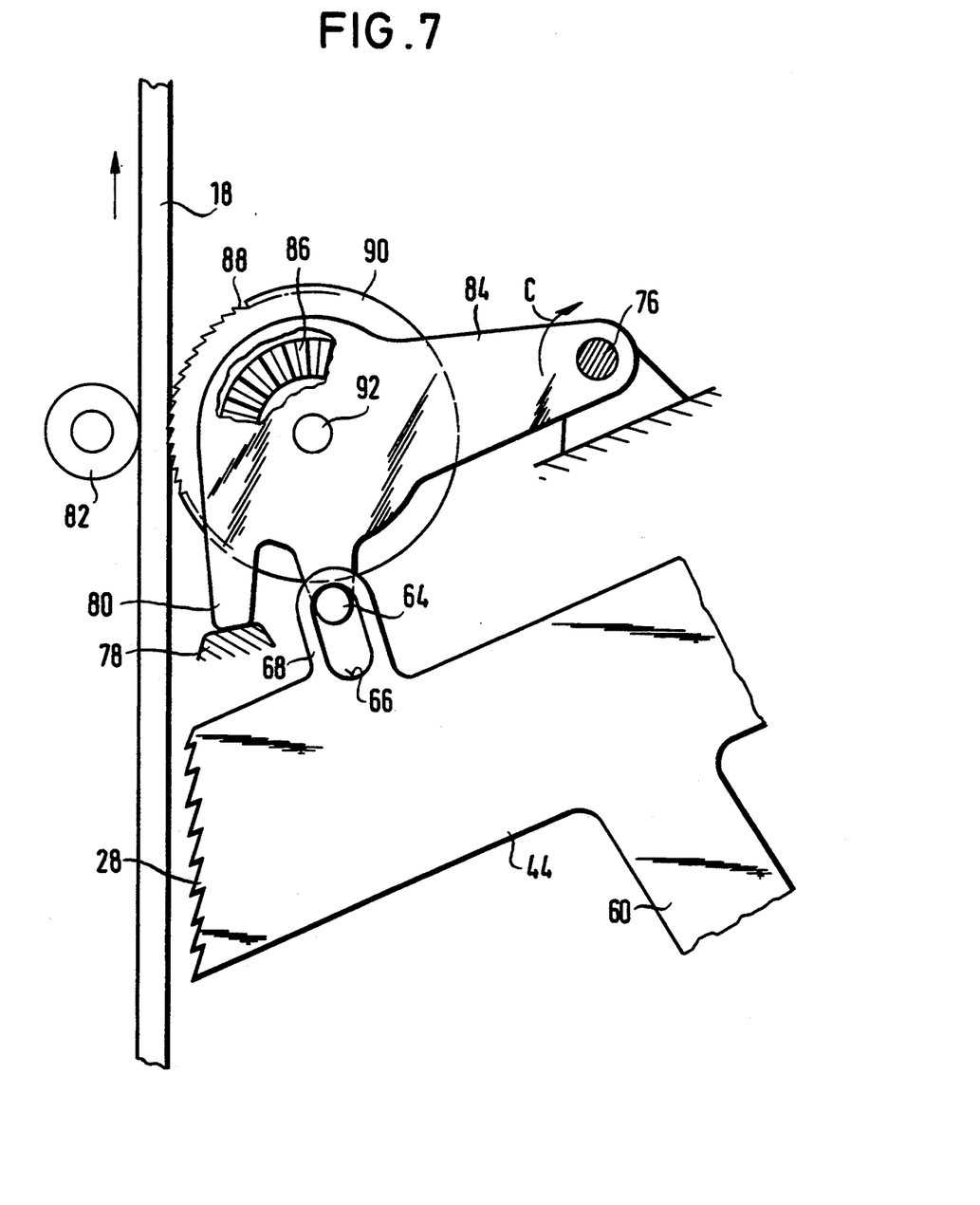

The description of the belt-sensitive sensor WS which is schematically shown in FIG. 5 is based on FIG. 7. There a carrier 84 is rotatably mounted in an axle 76 on the rocking lever 38. On an axle 92 of this carrier a WS capsule 90 rotates with an outer indentation 88, which always engages in belt 18 so that this capsule rotates when the belt is moved. On carrier 84 there is a notch indentation 86 with which a locking pawl which is not shown but which is controlled by mass inertia can engage when the belt is withdrawn at an acceleration exceeding a predetermined limit, so that thereby the carrier 84 is coupled with the WS capsule 90 in such manner that the belt, when moving further, causes a pivotal movement of said carrier in the direction of the arrow C, i. e. in the clockwise direction in FIG. 7.

On the opposite side of the belt to the WS capsule 90, a spring compression loaded counter pressure roller 82 can be arranged. Moreover the carrier 84 is provided with a shoulder 80 which impacts against a fixed stop 78 of the rocking lever 38 when the WS sensor is located in its non-activated start position.

The WS capsule 90 is pressed at a certain pressure against belt 18 and thus passes over the indentation 88 without any special resistance with the belt. The locking takes place for example at a belt extraction between 1.0 g and 1.5 g.

This embodiment has the advantage that there is direct dependence of the initiation on the belt acceleration. There is always the same response sensitivity since independence from the belt angle, the rotary angle acceleration of the shaft or the reel diameter is ensured. The blocking is possible in the case of short belt withdrawals, since according to the invention every activation of the sensor initiates clamping readiness. In addition there is a variable potential for arrangement in connection with a small component. Moreover this compact component is especially to be found in the variant of the embodiment according to FIG. 5. This clamping device includes an important inventive idea. It is doubly self-sensing and independent—thus autarchic——and can be installed at any desired point between the door threshold and deflector fitting as is very clearly shown by FIG. 8.

When, observing FIG. 5, the belt-sensitive sensor WS is activated by a certain belt acceleration, the carrier 84 moves in the clockwise direction corresponding to the arrow shown in FIG. 5, while the pin 64 pivots corresponding to the arrow B the precontrol lever 44 in the clockwise direction, and thus the gripping surface 53 of gripper element 52 is brought to engage with belt 18 with the result that the belt exerts a force on the precontrol lever 44 such that a further movement in the direction of arrow B takes place. Because of carrier 70 there is therefore a movement of the rocking lever 38 in the same direction, so that the clamping surface 28 of the clamping member 26 comes into contact with the belt.

In the case of a car-sensitive initiation caused by sensor S, a movement of the ball 48 effects the raising of the control pawl 110 over the plunger 60 and equally a movement of the precontrol lever 44 corresponding to arrow B so that the same process takes place as before. The longitudinal slit 66 prevents any impediment of this movement by sensor WS.

Figure 8:
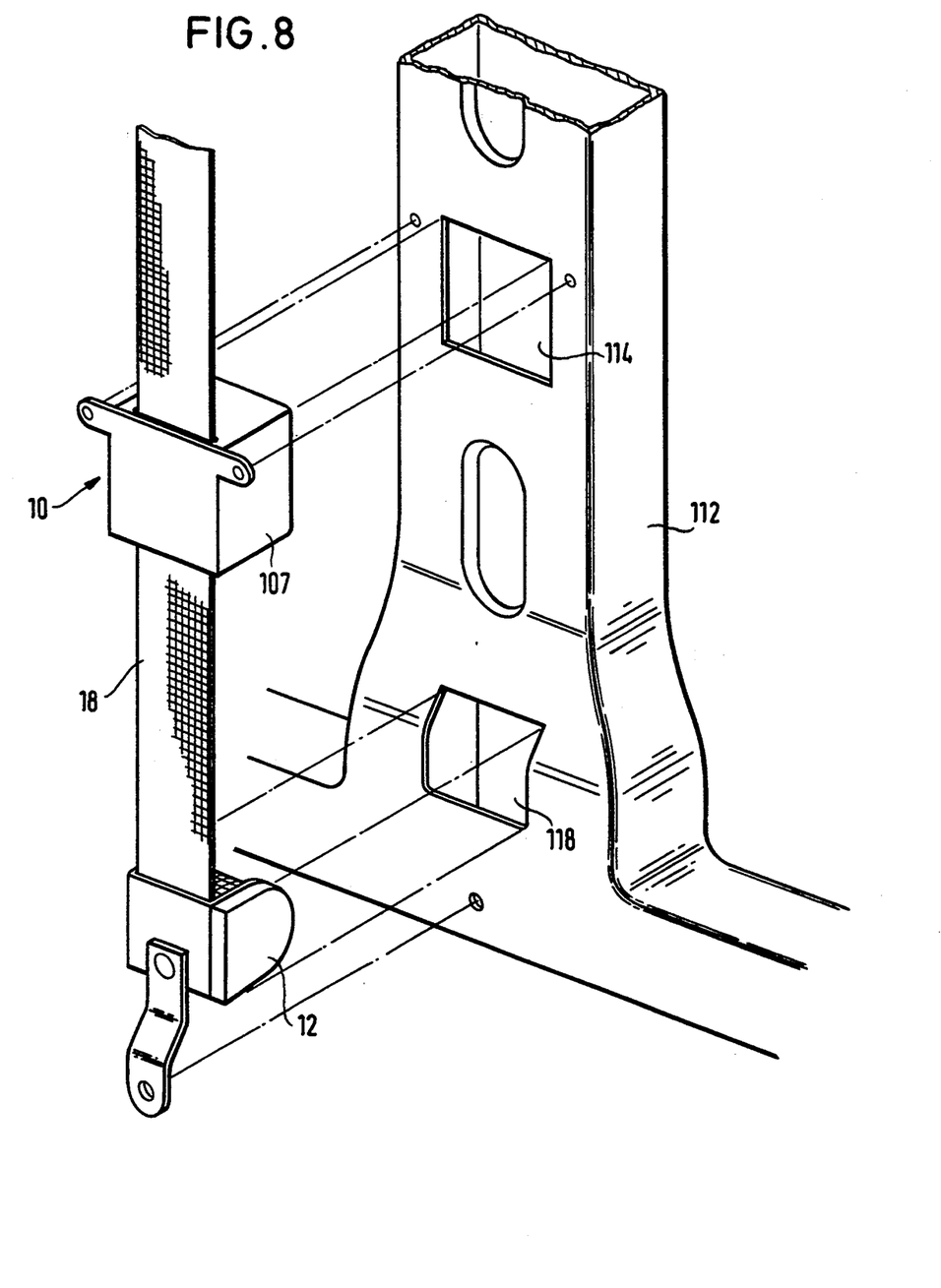

FIG. 8 shows how the clamping device 10 can be accomodated with its housing 107 independently of other installations such as the winder 12, or a deflector which is not shown, for example in the so-called B column. This B column 112 has for this purpose an assembly aperture 114. An assembly aperture 118 is located in the lower section of the B column for the installation and assembly of the winder 12. This self-sensing clamping device can be placed at discretion between the winder and the deflector as an independent and autarchic unit which is not dependent on automatic winders (storage), and it represents a very important alternative to a self-locking automatic winder, a wind-clamping device or a deflection clamping device.

Figure 9:
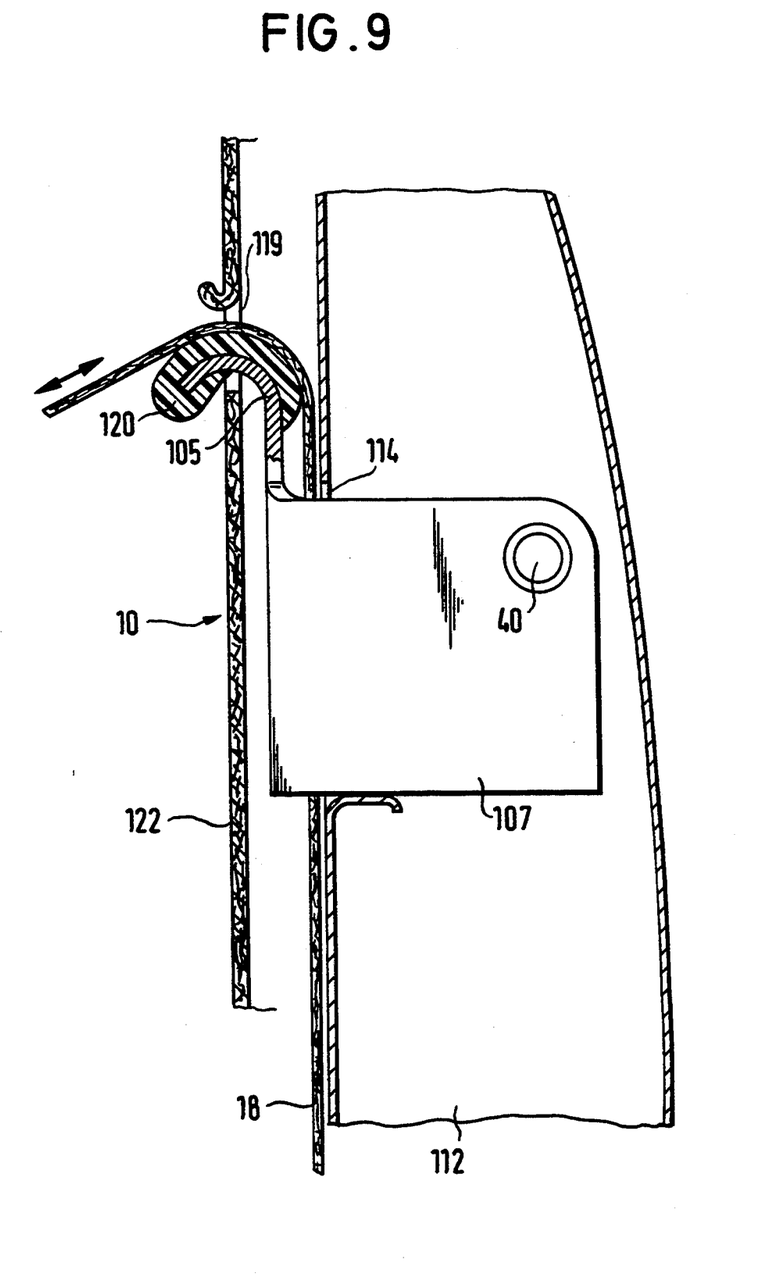

FIG. 9 shows the clamping device 10 designed as an integral unit with a deflector which interacts in connection with a slot 119 located in the lining of the B column 112, wherein the deflector 105 is a component part of the housing 107 of the clamping device 10. This deflector 105 is provided in the example shown with a plastic cap 120. The named lining has the reference numeral 122.

I claim:

1. A self-sensing clamping device for clamping a vehicle safety belt to limit belt extension draw off from a belt winder means upon the occurrence of predetermined acceleration and deceleration forces and without reliance on any sensor initiated locking of the winder means, said device comprising a movably-mounted clamping member, the belt normally being constrained in non-contacting relation with the clamping member, and sensor means having an inertia mass and being actuatable responsive to said predetermined acceleration and deceleration forces for movement between normally idle and occurrence positions, said sensor means being coupled with a belt engageable precontrol element that is moveable responsive to sensor means movement, the movement of said precontrol element associated with sensor means movement to occurrence position operating to effect contact of said belt with said clamping member by the precontrol element engaging the belt and thereby transmitting force to the clamping member to move it into contact with the belt, said sensor means including means actuatable in response to the occurrence of belt acceleration forces.

2. A self-sensing clamping device for clamping a vehicle safety belt to limit belt extension draw off from a belt winder means upon the occurrence of predetermined acceleration and deceleration forces and without reliance on any sensor initiated locking of the winder means, said device comprising a movably-mounted clamping member, the belt normally being constrained in non-contacting relation with the clamping member, sensor means actuatable responsive to said predetermined acceleration and deceleration forces for movement between normally idle and occurrence positions, said sensor means being coupled with a belt engageable precontrol element that is moveable responsive to sensor movement, the movement of said precontrol element associated with sensor means movement to occurrence position operating to effect contact of said belt with said clamping member by the precontrol element engaging the belt and thereby transmitting force to the clamping member to move it into contact with the belt, said sensor including means actuatable in response to the occurrence of acceleration and deceleration forces and belt acceleration forces, and a rocking lever mounted for pivoting movement about a first end thereof, the clamping member being connected to a second end of said rocking lever, the clamping member having a clamping surface, said clamping surface being spaced adjacent said belt when said precontrol element is in said idle position, it being further provided that said clamping member is hingedly connected to the second end of said rocking lever, said precontrol element being rotatably mounted on said clamping member, said precontrol element rotating when moving from idle to occurrence positions there of into engagement with said belt, said rocking lever having a stop thereon, said clamping member engaging said stop when said precontrol element is in occurrence position, said belt in extraction travel thereof exerting force on said precontrol element in its occurrence position which force in turn is transmitted through said clamping member to said rocking lever to cause pivoting of said rocking lever to move the clamping member towards and into contact with said belt.

3. A clamping device in accordance with claim 2 in which the precontrol element is a lever one end of which is rotatably mounted to said clamping member.

4. A clamping device in accordance with claim 2 further including a counter pressure surface, extension of the belt while in clamping contact with said clamping member pivoting said rocking lever sufficiently to move said clamping member and said belt clampingly against said counter pressure surface.

5. A clamping device in accordance with claim 2 in which the precontrol element comprises a precontrol lever, said precontrol lever being pivoted at a first end thereof on a common mounting with said rocking lever.

6. A clamping device in accordance with claim 5 in which said rocking lever has a groove therein, said precontrol lever being disposed in said groove, said rocking lever having a carrier member thereon, said precontrol lever including means for engaging said rocking lever in said occurrence position to pivot said rocking lever and move said clamping member towards and into contact with said belt.

7. A clamping device in accordance with claim 6 in which said sensor means includes a sensor actuatable responsive to the occurrence of vehicle acceleration and deceleration forces, the precontrol lever carrying a plunger member extending through a passage in the rocking lever to engagement with said sensor, actuation of said sensor moving said plunger member to correspondingly move said precontrol lever to occurrence position.

8. A clamping device in accordance with claim 5 in which the sensor means includes a first sensor including means actuable in response to the occurrence of vehicle acceleration and deceleration forces, and a second sensor including means actuable in response to belt acceleration forces, each of said sensors being connected to said precontrol lever to move it to occurrence position independently of the other upon occurrence of the forces associated therewith.

9. A clamping device in accordance with claim 8 further comprising belt storage means located at one side of said rocking lever, the first sensor being located at said one side, there being a plunger member carried on the precontrol lever and engageable with said first sensor, so that said first sensor upon actuation pushes said plunger to move said precontrol lever to occurrence position, the second sensor being located on the other side of said rocking lever and so connected thereto as to pull said precontrol lever into occurrence position.

10. A clamping device in accordance with claim 9 in which said precontrol lever has a longitudinal slit, said second sensor including an actuation pin engaged in said longitudinal slit.

11. A clamping device in accordance with claim 5 in which a second end of said precontrol lever carries a gripper element mounted thereto for limited rotation relative thereto, said gripper element having a gripping surface, said gripping surface engaging said belt when said precontrol lever moves to occurrence position.

12. A clamping device in accordance with claim 11 in which the clamping member is rotatably mounted to the other end of said rocking lever and the said gripping element and the said clamping member are rotatable relative to the respective precontrol lever and rocking lever under condition of frictional movement therewith such that an initial engagement of said gripper element and clamping member, having a clamping surface, with said belt effects a relative angular positioning of the gripper element gripping surface and the clamping member clamping surface with the respective precontrol lever and rocking lever so that in subsequent engagements of said gripper element and clamping member with the belt, the respective full gripping surface and clamping surface contact said belt.

13. A clamping device in accordance with claim 2 in which the sensor means is one actuatable responsive to belt acceleration forces produced by belt extraction travel, the precontrol element in idle position engaging said belt and maintaining said belt spaced from said clamping surface but yieldably moving to occurrence position in the presence of said forces to effect clamping contact of the belt and clamping member.

14. A clamping device in accordance with claim 13 comprising bias applying means connected with said precontrol element and normally urging it into the idle position thereof.

15. A clamping device in accordance with claim 14 in which the precontrol element comprises a guidance member one side of which engages the belt, the bias applying means acting on the other side of said guidance member, the bias applying means yielding to the force applied to said guidance member when the belt engaged therewith undergoes extraction travel.

16. A clamping device in accordance with claim 14 in which the precontrol element comprises an angle lever mounted for pivoting movement intermediate its ends, one end of said angle lever engaging said belt and in idle position maintaining said belt spaced from said clamping surface, the other end of said angle lever engaging said rocking lever, said rocking lever being pivoted by said angle lever as said angle lever moves to occurrence position to move the clamping member into contact with the belt.

17. A clamping device in accordance with claim 15 in which said bias applying means is engaged with said rocking lever tending to pivot said rocking lever in a direction which causes rotation of said angle lever to its idle position.

18. A clamping device in accordance with claim 2 in which the sensor means is one actuatable responsive to belt acceleration forces produced by belt extraction travel, said sensor means further including a pivoted carrier arm, a rotary member rotatably mounted in said carrier arm, the surface of said rotary member being in rotatable drive engagement with said belt, said carrier arm being connected to said precontrol element, there being means for non-rotatably coupling said rotary member to said carrier arm responsive to predetermined belt acceleration forces whereby belt extraction travel accompanying said force pivots said carrier arm to move said precontrol element to occurrence position.

19. A clamping device in accordance with claim 2 in combination with a housing therefor, said housing being mountable in a column of a vehicle.

20. A clamping device in accordance with claim 9, further comprising a belt storage winder disposed in said housing.

21. A clamping device in accordance with claim 19 in which the housing includes a belt deflector extending therefrom and outwardly from said column.

22. A self-sensing clamping device for clamping a vehicle safety belt to limit belt extension draw off from a belt winder means upon the occurrence of predetermined acceleration and deceleration forces and without reliance on any sensor initiated locking of the winder means, said device comprising a movably-mounted clamping member, the belt normally being constrained in non-contacting relation with the clamping member, and
   sensor means actuatable responsive to said predetermined acceleration and deceleration forces for movement between normally idle and occurrence positions, said sensor means being coupled with a belt engageable precontrol element that is moveable responsive to sensor means movement, the movement of said precontrol element associated with sensor means movement to occurrence position operating to effect contact of said belt with said clamping member by yieldably retracting from a belt engaging position to release constraint on the belt so it can move into contact with the clamping member draw-off movement of the belt while in contact with the clamping member moving the clamping member to clamping position against a counter-pressure surface with the belt therebetween.

23. A clamping device in accordance with claim 22 further comprising a rocking lever mounted for pivoting movement about a first end thereof, the clamping member being connected to a second end of said rocking lever, the clamping member having a clamping surface, said clamping surface being spaced adjacent said belt when said precontrol element is in idle position.

24. A clamping device in accordance with claim 23 in which said clamping member is hingedly connected to one end of said rocking lever, said precontrol element being rotatably mounted on said clamping member, said precontrol element rotating when moving from idle to occurrence positions thereof into engagement with said belt, said rocking lever having a stop thereon, said clamping member engaging said stop when said precontrol element is in occurrence position, said belt in extraction travel thereof exerting force on said precontrol element in its occurrence position which force in turn is transmitted through said clamping member to said rocking lever to cause pivoting of said rocking lever to move the clamping member towards and into contact with said belt.

25. A self-sensing clamping device for clamping a vehicle safety belt to limit belt extension draw off from a belt winder means upon the occurrence of predetermined acceleration and deceleration forces and without reliance on any sensor initiated locking of the winder means, said device comprising a movably-mounted clamping member, the belt normally being constrained in non-contacting relation with the clamping member, and
   sensor means having an inertia mass and being actuatable responsive to said predetermined acceleration and deceleration forces for movement between normally idle and occurrence positions, said sensor means being coupled with a belt engageable precontrol element that is moveable responsive to sensor means movement, the movement of said precontrol element associated with sensor means movement to occurrence position operating to effect contact of said belt with said clamping member by the precontrol element engaging the belt and thereby transmitting force to the clamping member to move it into contact with the belt, said sensor means including means actuatable in response to the occurrence of belt acceleration forces;
   a rocking lever mounted for pivoting movement about a first end thereof, the clamping member being connected to a second end of said rocking lever, the clamping member having a clamping surface, said clamping surface being spaced adjacent said belt when said precontrol element is in idle position, said clamping member being hingedly connected to one end of said rocking lever, said precontrol element being rotatably mounted on said clamping member, said precontrol element rotating when moving from idle to occurrence positions thereof into engagement with said belt, said rocking lever having a stop thereon, said clamping member engaging said stop when said precontrol element is in occurrence position, said belt in extraction travel thereof exerting force on said precontrol element in its occurrence position which force in turn is transmitted through said clamping member to said rocking lever to cause pivoting of said rocking lever to move the clamping member towards and into contact with said belt.

26. A self-sensing clamping device for clamping a vehicle safety belt to limit belt extension draw off from a belt winder means and upon the occurrence of predetermined acceleration and deceleration forces and without reliance on any sensor initiated locking of the winder means, said device comprising:

a movably-mounted clamping member, the belt normally being constrained in non-contacting relation with the clamping member;

sensor means having an inertia mass and being actuatable responsive to said predetermined acceleration and deceleration forces for movement between normally idle and occurrence positions, said sensor means being coupled with a belt engageable precontrol lever that is moveable responsive to sensor means movement, the movement of said precontrol lever associated with sensor means movement to occurrence position operating to effect contact of said belt with said clamping member by the precontrol lever engaging the belt and thereby transmitting force to the clamping member to move it into contact with the belt; and a rocking lever mounted for pivoting movement about a first end thereof, the clamping member being hingedly connected to a second end of said rocking lever, the clamping member having a clamping surface, said clamping surface being spaced adjacent said belt when said precontrol lever is in idle position, said precontrol lever being pivoted at a first end thereof on a common mounting with said rocking lever.

27. A self-sensing clamping device for clamping a vehicle safety belt to limit belt extension draw off from a belt winder means and upon the occurrence of predetermined acceleration and deceleration forces and without reliance on any sensor initiated locking of the winder means, said device comprising:

a movably-mounted clamping member, the belt normally being constrained in non-contacting relation with the clamping member; and sensor means having an inertia mass and being actuatable responsive to said predetermined acceleration and deceleration forces for movement between normally idle and occurrence positions, said sensor means being coupled with a belt engageable precontrol lever that is moveable responsive to sensor means movement, the movement of said precontrol lever associated with sensor means movement to occurrence position operating to effect contact of said belt with said clamping member by the precontrol lever engaging the belt and thereby transmitting force to the clamping member to move it into contact with the belt, said precontrol lever having a first end which is rotatably mounted to said clamping member, said precontrol lever rotating when moving from idle to occurrence positions thereof into engagement with said belt.

28. A self-sensing clamping device as in claim 27 further comprising:

a rocking lever mounted for pivoting movement about a first end thereof, the clamping member being hingedly connected to a second end of said rocking lever, the clamping member having a clamping surface, said clamping surface being spaced adjacent said belt when said precontrol lever is in idle position, said rocking lever having a stop thereon, said clamping member engaging said stop when said precontrol lever is in occurrence position, said belt in extraction travel thereof exerting force on said precontrol lever in its occurrence position which force in turn is transmitted through said clamping member to said rocking lever to cause pivoting of said rocking lever to move the clamping member towards and into contact with said belt.

* * * * *